(12) United States Patent
Pursey et al.

(10) Patent No.: US 11,472,574 B2
(45) Date of Patent: Oct. 18, 2022

(54) METHODS AND ASSEMBLIES FOR MOUNTING EQUIPMENT TO AN AIRCRAFT

(71) Applicant: Raytheon Systems Limited, Glenrothes (GB)

(72) Inventors: Andrew Giles Pursey, Harlow (GB); Laurence Baron, Harlow (GB)

(73) Assignee: Raytheon Systems Limited, Glenrothes (GB)

( * ) Notice: Subject to any disclaimer, the term of this patent is extended or adjusted under 35 U.S.C. 154(b) by 148 days.

(21) Appl. No.: 16/897,876

(22) Filed: Jun. 10, 2020

(65) Prior Publication Data

US 2020/0385146 A1    Dec. 10, 2020

(51) Int. Cl.
*B64F 5/10*    (2017.01)
*B64C 5/02*    (2006.01)
(Continued)

(52) U.S. Cl.
CPC ............. *B64F 5/10* (2017.01); *B64C 5/02* (2013.01); *B64C 5/06* (2013.01); *B64C 7/00* (2013.01);
(Continued)

(58) Field of Classification Search
CPC .... B64C 5/02; B64C 5/06; B64C 7/00; B64C 1/00; B64C 1/0009; B64C 1/36;
(Continued)

(56) References Cited

U.S. PATENT DOCUMENTS 2,700,104 A * 1/1955 Bowman ............... H01Q 1/287
                                                    343/853
3,613,098 A   10/1971 Blasko
                     (Continued)

FOREIGN PATENT DOCUMENTS

CN   109305323 A   2/2019
EP     0753458 A1  1/1997
            (Continued)

OTHER PUBLICATIONS

Great Britain Combined Search and Examination Report dated Nov. 25, 2019 for Great Britain Application No. GB1908241.1; 6 Pages.
(Continued)

*Primary Examiner* — Joshua J Michener
*Assistant Examiner* — Cindi M Curry
(74) *Attorney, Agent, or Firm* — Daly Crowley Mofford & Durkee, LLP

(57) ABSTRACT

There is provided a method of mounting equipment to an aircraft having an empennage. The method comprises mounting equipment to a mounting structure for mounting to the aircraft; removing an access panel from the outer skin of the empennage of the aircraft to reveal an access panel opening into the empennage; and attaching the mounting structure to or within the access panel opening such that at least a portion of the equipment extends beyond the outer skin of the empennage. The shape of the mounting structure at least partly conforms to the shape of the access panel opening. The method also comprises covering the mounting structure and the equipment mounted thereon with a cover, and attaching the cover to the mounting structure or the empennage. An assembly, structure, tailplane and aircraft are also provided.

21 Claims, 5 Drawing Sheets

(51) Int. Cl.
  *B64C 5/06* (2006.01)
  *B64D 45/02* (2006.01)
  *B64C 7/00* (2006.01)
  *B64D 47/02* (2006.01)
  *B64C 9/00* (2006.01)

(52) U.S. Cl.
  CPC ............... *B64C 9/00* (2013.01); *B64D 45/02* (2013.01); *B64D 47/02* (2013.01)

(58) Field of Classification Search
  CPC .......... B64D 45/02; H01Q 1/28; H01Q 1/287; H01Q 1/282
  See application file for complete search history.

(56) References Cited

U.S. PATENT DOCUMENTS

| | | | | |
|---|---|---|---|---|
| 4,034,939 | A * | 7/1977 | Ridley, Jr. | ................. B64C 7/00 244/87 |
| 4,057,104 | A | 11/1977 | Altoz | |
| 5,096,142 | A * | 3/1992 | Rodriguez | ................ B64C 7/00 244/87 |
| 5,283,643 | A * | 2/1994 | Fujimoto | ............... B64D 45/00 340/973 |
| 5,929,816 | A * | 7/1999 | Gross | .................... H01Q 1/282 343/705 |
| 6,094,171 | A | 7/2000 | Riddle et al. | |
| 6,407,714 | B1 * | 6/2002 | Butler | ..................... H01Q 1/28 343/766 |
| 8,063,837 | B1 | 11/2011 | Jennings et al. | |
| 10,476,296 | B1 * | 11/2019 | Rausch | ..................... H02J 7/35 |
| 10,557,934 | B1 * | 2/2020 | Billsberry | .............. H01Q 1/286 |
| 2008/0246670 | A1 | 10/2008 | Vlad et al. | |
| 2016/0068254 | A1 | 3/2016 | Nakashima | |
| 2016/0229536 | A1 | 8/2016 | Aull et al. | |
| 2017/0118873 | A1 * | 4/2017 | Szarek | .................. B64D 43/00 |
| 2017/0320591 | A1 * | 11/2017 | Tabuteau | ............... B64D 45/00 |
| 2018/0351243 | A1 * | 12/2018 | Lewis | .................... H01Q 1/282 |
| 2019/0162268 | A1 | 5/2019 | Chang et al. | |

FOREIGN PATENT DOCUMENTS

| | | | |
|---|---|---|---|
| EP | 2 100 811 A2 | 9/2009 | |
| EP | 2502828 A1 * | 9/2012 | ............ B64D 47/00 |
| EP | 3 239 038 A1 | 11/2017 | |
| EP | 3239038 A1 * | 11/2017 | ............... H01Q 1/28 |
| KR | 10-1092752 B1 | 12/2011 | |

OTHER PUBLICATIONS

Great Britain Combined Search and Examination Report dated Nov. 15, 2019 for Great Britain Application No. GB1908238.7; 5 Pages.
Great Britain Examination Report dated Sep. 3, 2021 for Great Britain Application No. 1908241.1; 4 Pages.
U.S. Appl. No. 16/897,890, filed Jun. 10, 2020, Pursey et al.
U.S. Non-Final Office Action dated Jun. 6, 2022 for U.S. Appl. No. 16/897,890; 20 pages.

* cited by examiner

METHODS AND ASSEMBLIES FOR MOUNTING EQUIPMENT TO AN AIRCRAFT

This application claims priority to UK Patent Application No. 1908241.1 filed on Jun. 10, 2019 in the UK Intellectual Property Office, the entire disclosure of which is incorporated herein by reference.

FIELD OF THE INVENTION

The present invention relates to a method of mounting equipment to an aircraft, and in particular mounting equipment to an aircraft having an empennage. In one aspect, the invention relates to a method of mounting equipment to a tailplane. An equipment assembly is also provided, along with a structure for an aircraft for attaching the equipment assembly. A tailplane comprising the structure for attaching the equipment assembly is also provided, along with an empennage or an aircraft comprising the structure for attaching the equipment assembly.

BACKGROUND

Equipment such as sensors, recording equipment and electronic equipment or systems, including electronic circuits can be added to the exterior of an aircraft as circumstances dictate. Whilst one might suppose that a number of different locations on an aircraft may be used for these purposes, in fact it is the case that adverse effects can arise in respect of both equipment and aircraft performance, depending on the nature of the equipment and the site for the equipment. For example, mounting equipment to the outside of the aircraft's main body or fuselage may significantly adversely affect the aerodynamic profile of the aircraft. Furthermore, positioning equipment such as sensors, recording equipment or electronic equipment or systems, including electronic circuits in certain locations inside or outside the aircraft may not be optimal, for instance due to presence of wings, engine parts, and so on.

KR101092752B discloses equipment that is internal to the aircraft and is protected by a structure that conforms to the aircraft vertical stabilizer. U.S. Pat. No. 3,613,098 A also discloses equipment that is internal to the aircraft and is protected by a structure that is flush with the aircraft's vertical stabilizer. Because in both of these cases the equipment is located inside the aircraft body, its performance is affected. Moreover, there is often difficulty mounting equipment in such a location. U.S. Pat. No. 4,057,104 A discloses a rounded aerofoil-shaped pod mounted on top of a vertical stabilizer of an aircraft. The longitudinal axis of the pod is aligned with the top of the vertical stabilizer. Again, accessing the space inside the pod can be difficult, and moreover the space afforded by such an arrangement is highly constrained.

There is thus a need for a simple way to attach equipment to the exterior of an aircraft whilst maximizing ease of installation and available space for the equipment without adversely affecting its performance or the aerodynamic profile of the aircraft.

SUMMARY OF THE INVENTION

In a first aspect, the present invention provides a method of mounting equipment to an aircraft having an empennage. The method comprises mounting equipment to a mounting structure for mounting to the aircraft. Prior to, contemporaneously with or after this step is performed, the method comprises removing an access panel from the outer skin of the empennage of the aircraft to reveal an access panel opening into the empennage. Aircraft engineers are familiar with access panels on aircraft body structures, including empennage structures, and the step of removing an access panel from the outer skin of the empennage is straightforward and can be achieved with conventional tools.

Once the access panel opening is revealed, the method comprises attaching the mounting structure to or within the access panel opening such that at least a portion of the equipment extends beyond the outer skin of the empennage. In placing at least a portion of the equipment such that it extends beyond the outer skin of the empennage, the performance of the equipment is compromised as little as possible; that is, the effect of the aircraft structures on the equipment will be reduced compared with mounting the equipment within the aircraft.

In attaching the mounting structure to or within the access panel opening, the shape of the mounting structure at least partly conforms to the shape of the access panel opening so as to facilitate the attachment between the two structures and minimize undesirable gaps in the surface of the structure or skin of the aircraft.

The method comprises covering the mounting structure and the equipment mounted thereon with a cover, and attaching the cover to the mounting structure or the empennage. Placing a cover over the equipment preserves as far as possible the trim of the aircraft and minimizes drag, whilst avoiding interference with the performance of the equipment. For instance, the cover may preferably be constructed from materials which compromise the performance of the equipment to a lesser extent than the aircraft structure, for example a composite material, a reinforced plastic material, a carbon fibre material or a metal to suit the equipment being covered by the cover. For instance, if the equipment includes a camera, the cover may be transparent.

Preferably the access panel is a planar (i.e. flat) inspection panel. This facilitates mounting of a mounting structure which preserves as far as possible the performance of the equipment mounted thereon, and provision of a cover which interferes with the trim of the aircraft as little as possible. Preferably the access panel opening is a planar inspection panel opening for providing access to the empennage of the aircraft. By 'access' it is meant access to the interior structure of the empennage beneath the skin of the aircraft.

Whilst the invention may be performed on an empennage of any construction, preferably the empennage has T-tail configuration comprising a fin mounted to a fuselage of the aircraft at its lower end, and a tailplane mounted to the fin at its upper end. In that case, the step of removing an access panel comprises removing an access panel from the upper surface of the tailplane. It will be appreciated that locating equipment on the upper surface of a tailplane that is mounted to the upper end of a fin extending from the fuselage will provide the equipment with more space than would otherwise be available, and minimize the effect on the equipment from other aircraft structures.

In the case of an empennage having a T-tail configuration, preferably the step of removing an access panel comprises removing an access panel from a central region of the upper surface of the tailplane. Preferably, the central region is located equidistantly between two control surfaces on the empennage. Typically, such control surfaces on the tailplane of a T-tail empennage are elevators, and locating the equipment in an access panel opening here will locate it away from structures and systems which may get in the way of, or otherwise interfere with, the equipment. Thus, this location facilitates mounting the equipment to the aircraft.

As described in more detail elsewhere herein, preferably the mounting structure is a tray comprising a planar base and at least one mounting portion extending in parallel with or orthogonally to the base. For example, the planar base may have one or more sides, forming the at least one mounting portion, which may be upstanding around at least part of the periphery of the base. The sides may extend in one or both directions away from the plane of the planar base, and may extend around some or all of the periphery. Alternatively, the at least one mounting portion may extend in the same plane as the planar base, again around at least some or all of the periphery. The mounting portion may extend parallel with the base, but in a different plane and be attached to the base via a stepped arrangement. In any event, the step of attaching the mounting structure to or within the access panel opening preferably comprises passing one or more fasteners through the at least one mounting portion. The fasteners are preferably one or more of screws, nuts and bolts, but may be another suitable fastening mechanism. Of course, in other embodiments, the mounting structure may be welded or glued in place.

Preferably the fasteners extend from or are passed though the at least one mounting structure to engage a corresponding one or more fastening sites in the access panel opening or in an adjacent empennage structure. Preferably they pass through holes in the mounting structure.

Prior to the invention taking place, these fastening sites may be used to locate the access panel to the empennage. Thus, in some preferred embodiments, the step of removing the access panel from the outer skin of the empennage of the aircraft comprises removing one or more fasteners passing through the access panel from the said one or more fastening sites.

Similarly, as described in more detail elsewhere herein, the cover has a lower portion, beneath a main wall of the cover, which is used to attach the cover to the empennage. For example, the cover may have one or more sides at the lower portion, which may extend at least partially obliquely, preferably laterally, around at least part of the periphery of the lower edge of the cover. Alternatively, the lower portion may extend in the same plane as the cover wall, again around at least some or all of the periphery. The mounting portion may extend parallel with the cover wall, but in a different plane and be attached to the cover wall via a stepped arrangement.

In any event, preferably the step of attaching the cover to the mounting structure or the empennage comprises passing one or more fasteners through the lower portion of the cover to a corresponding one or more fastening sites in the mounting structure, in the access panel opening or in an adjacent empennage structure. Again, the fasteners may be one or more of screws, nuts and bolts or other suitable fastening mechanism. Of course, in other embodiments, the mounting structure may be welded or glued in place.

In some embodiments, a method according to the invention further comprises the step of routing cables from the aircraft to the equipment on the mounting structure. The cables may transmit electrical power and/or communication or control signals. The cables may be coupled to the equipment from any suitable location about the aircraft, including from the aircraft cockpit, cabin or avionics equipment bays.

In some cases, it may be preferable to remove an anti-collision light or any other part conventionally located on the empennage from its location (nominally a 'first' location) on the empennage. This may be done prior to at least the step of attaching the mounting structure to or within the access panel opening, and possibly prior to other of the method steps. The anti-collision light may prevent or hinder removal of the access panel, and/or attachment of the mounting structure to or within the access panel opening. Furthermore, the anti-collision light may effect the performance of the equipment.

Preferably the method further comprises the step of reattaching the anti-collision light to a different location (nominally a 'second' location) on the empennage, or in some cases elsewhere on the aircraft body altogether. Anti-collision lights are usually desirable, and so it is preferably to retain them where possible.

In a second aspect, the present invention provides an equipment assembly for attaching to an empennage of an aircraft. The equipment assembly comprises a mounting structure shaped, at least in part, to conform to an access panel opening on the empennage of the aircraft. As explained above, conformity between at least part of the mounting structure and the opening facilitates the attachment between the two structures and minimize undesirable gaps in the surface of the structure or skin of the aircraft.

The mounting structure comprises equipment extending from one side of the mounting structure. Whilst it is possible that the mounting structure could be configured symmetrically so that it may attach to an empennage such that either side faces outwards, it is preferred that the equipment extends from the side of the mounting structure that faces outwardly, in use, such that at least a portion of the equipment extends beyond the outer skin of the empennage.

The assembly further comprises a cover configured to cover the equipment and the mounting structure. The cover is preferably configured to preserve as far as possible the trim of the aircraft and minimize drag, whilst avoiding interference with the performance of the equipment. For instance, the cover may preferably be constructed from materials which compromise the performance of the equipment to a lesser extent than the aircraft structure, for example a composite material, a reinforced plastic material, a carbon fibre material or a metal to suit the equipment being covered by the cover. For instance, if the equipment includes a camera, the cover may be transparent.

The mounting structure is preferably a tray comprising a planar base and at least one mounting portion extending in parallel with or orthogonally to the base, the mounting portion configured to attach the mounting structure to the access panel opening or an adjacent empennage structure. As explained above, for example, the planar base may have one or more sides, forming the at least one mounting portion, which may be upstanding around at least part of the periphery of the base. The sides may extend in one or both directions away from the plane of the planar base, and may extend around some or all of the periphery. Alternatively, the at least one mounting portion may extend in the same plane as the planar base, again around at least some or all of the periphery. The mounting portion may extend parallel with the base, but in a different plane and be attached to the base via a stepped arrangement.

The mounting portion preferably comprises at least one fastener, more preferably a plurality of fasteners, or else is configured to allow one or more such fasteners to pass through the at least one mounting portion, preferably through openings therein. Preferably the fasteners extend from or are passed though the at least one mounting structure to engage a corresponding one or more fastening sites in the access panel opening or in an adjacent empennage structure. Preferably they pass through holes in the mounting structure.

In particular, the mounting portion preferably comprises openings that are spaced apart by a distance corresponding to the distance between fastening sites in the access panel opening or in an adjacent empennage structure to which the mounting portion is to be attached. The fastening site are as previously described.

Similarly, the cover preferably comprises a lower portion comprising at least one fastener, more preferably a plurality of fasteners, configured to attach the cover to the mounting structure, the access panel opening or an adjacent empennage structure, or else is configured to allow one or more such fasteners to pass through the lower portion, preferably through openings therein. For example, the cover may have a lower portion, beneath a main wall of the cover, which is used to attach the cover to the empennage. For example, the cover may have one or more sides at the lower portion, which may extend at least partially obliquely, preferably laterally, around at least part of the periphery of the lower edge of the cover. Alternatively, the lower portion may extend in the same plane as the cover wall, again around at least some or all of the periphery. The mounting portion may extend parallel with the cover wall, but in a different plane and be attached to the cover wall via a stepped arrangement.

The assembly of any one of claims 16 to 18, wherein the lower portion of the cover comprises openings that are spaced apart by a distance corresponding to the distance between fastening sites in the mounting structure, in the access panel opening or in an adjacent empennage structure to which the cover is to be attached.

In some embodiments the assembly may further comprise cables extending from equipment on the mounting structure. The cables may transmit electrical power and/or communication or control signals. The cables may be coupled to the equipment from any suitable location about the aircraft, but preferably from the aircraft cockpit or cabin.

The cover is preferably configured to preserve as far as possible the trim of the aircraft and minimize drag, whilst avoiding interference with the performance of the equipment. For instance, the cover may preferably be constructed from materials which compromise the performance of the equipment to a lesser extent than the aircraft structure, for example a composite material, a reinforced plastic material, a carbon fibre material or a metal to suit the equipment being covered by the cover. For instance, if the equipment includes a camera, the cover may be transparent.

Preferably the cover is configured to protect the aircraft and/or the mounting structure and/or equipment mounted within the mounting structure from lightning. To that end, the cover and/or the mounting structure may be made from or include a material that can conduct energy from a lightning strike into the aircraft structure, such as the empennage, so that it can be safely dispersed without causing damage to the cover itself, the adjacent empennage, and the mounting structure and any equipment contained under the cover. Suitable materials are metal or a composite with a metallic mesh laid into it. Alternatively or additionally, lightning protection strips may be added to the exterior of the cover.

In a third aspect, the present invention provides a structure forming at least part of empennage of an aircraft. Such structures typically include fins and tailplanes, and in the present aspect the tailplane is preferred structure. In any event, the structure comprises an access panel opening and an equipment assembly of the kind described above attached to or within the access panel opening. At least a portion of the equipment of the assembly extends beyond the outer skin of the empennage. As described elsewhere herein, the shape of the mounting structure of the assembly at least partly conforms to the shape of the access panel opening.

Preferably the access panel opening is a planar inspection panel opening for providing access to the empennage of the aircraft. By 'access' it is meant access to the interior structure of the empennage beneath the skin of the aircraft.

Whilst the invention may be provided on an empennage of any construction, preferably the empennage has T-tail configuration comprising a fin mounted or mountable to a fuselage of the aircraft at its lower end, and a tailplane mounted to the fin at its upper end. In that case, access panel opening is located in the upper surface of the tailplane. It will be appreciated that equipment which is located on the upper surface of a tailplane that is mounted to the upper end of a fin extending from the fuselage will provide the equipment with more space and minimize the effect in the equipment from the other aircraft structures.

Preferably the access panel is located in a central region of the upper surface of the tailplane, wherein the central region is preferably located equidistantly between two control surfaces, preferably elevators, on the empennage. Typically, such control surfaces on the tailplane of a T-tail empennage are elevators, and equipment located in an access panel opening here will mean it is away from structures and systems which may get in the way of, or otherwise interfere with, the equipment.

Also provided by the invention is a tailplane, empennage or an aircraft comprising the structure as described above.

BRIEF DESCRIPTION OF THE DRAWINGS

The invention will now be described in detail with reference to the accompanying drawings, in which.

DETAILED DESCRIPTION

Figure 1:
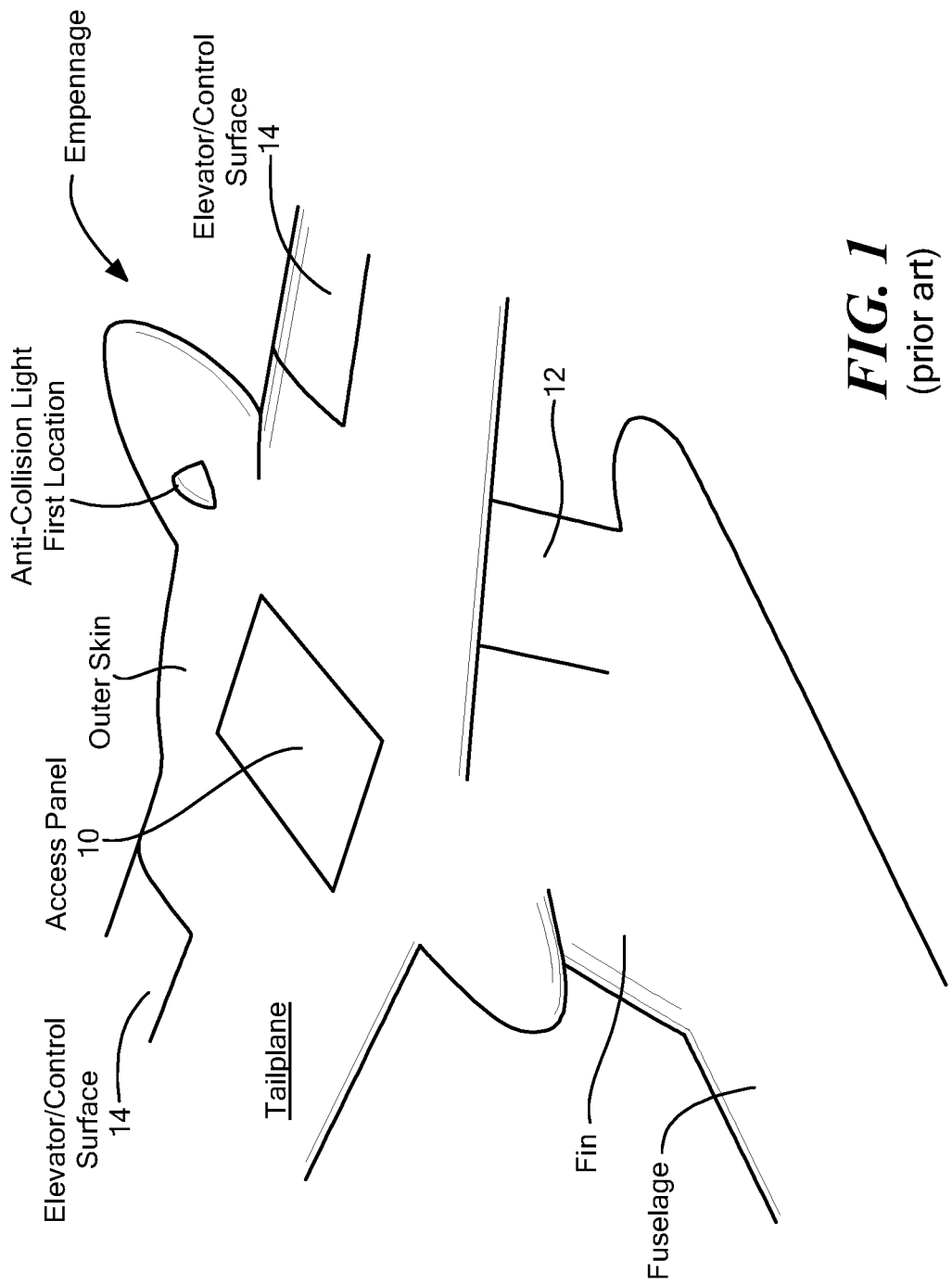
FIG. 1 shows a perspective view of a prior art empennage of an aircraft showing an exemplary inspection hatch in situ.

With reference to the drawings, there is shown a system for providing equipment such as sensors, recording equipment and various electronic equipment or systems, including electronic circuits to the exterior of an aircraft. The system comprises a mounting structure 100, 200. The mounting structure in this example takes the form of a tray 101, 201 which comprises a base 102, 202 and edge portions 103 (or sides). In the examples shown in FIGS. 2a and 2b, the base 102, 202 is substantially rectangular. In the example shown in FIG. 2a, the structure has three sides 103 extending perpendicular to the base. Two of the three sides 103b, 103c (in this case, the long sides) oppose either other; that is, they are provided on opposite sides of the base. The third side 103a extends between the two opposing sides at one end of the base 102. In the example shown in FIG. 2b, the structure has two opposing edge portions 203a, 203b (in this case, the long edges) extending in the same plane as the base, and two opposing sides portions 203c, 203d (in this case, the short edges) extending perpendicular to the base. However, the skilled person would appreciate that the base could take any shape, and be provided with any number of corresponding edge portions or sides. For example, a square/rectangular base with any two edges (i.e. adjacent, or opposing), three edges or four edges. Similarly, a circular base with a continuous edge can be used. In essence, the mounting structure is readily customizable as required.

Figure 2A:
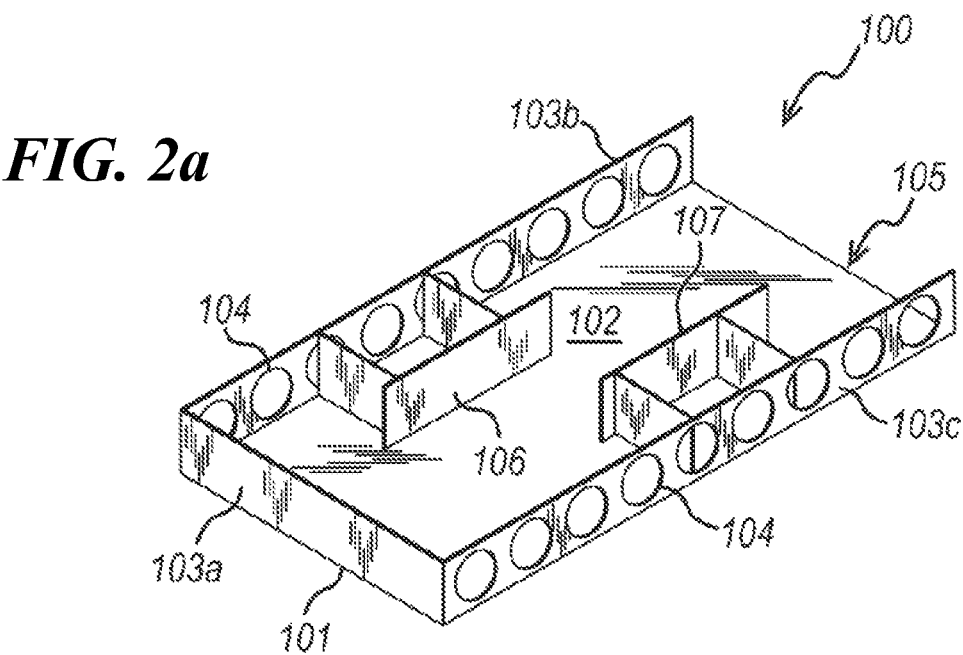
FIG. 2a shows a perspective view of an equipment assembly according to a first embodiment of the invention.
Figure 2B:
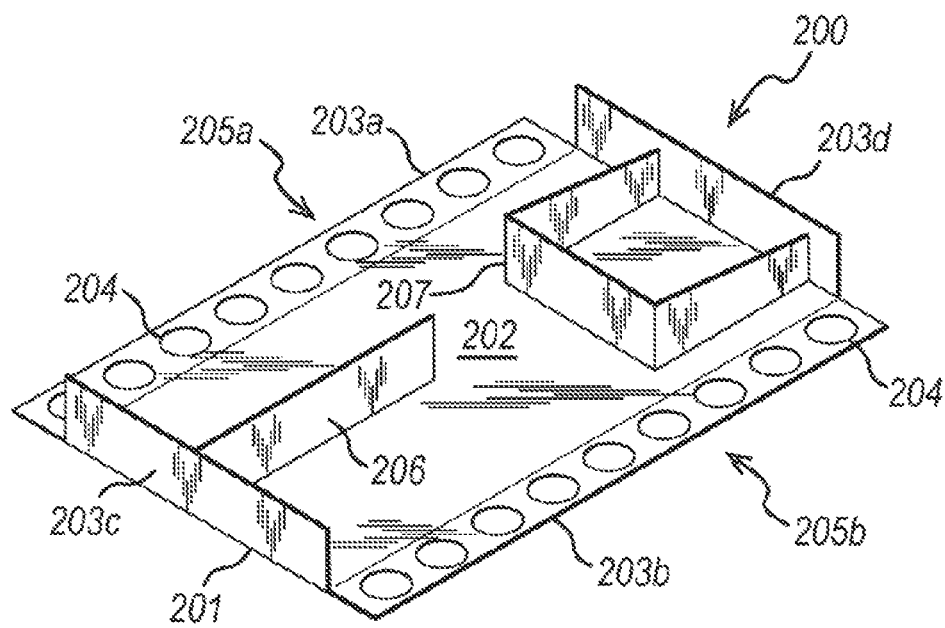
FIG. 2b shows a perspective view of an equipment assembly according to a second embodiment of the invention.
Figure 3:
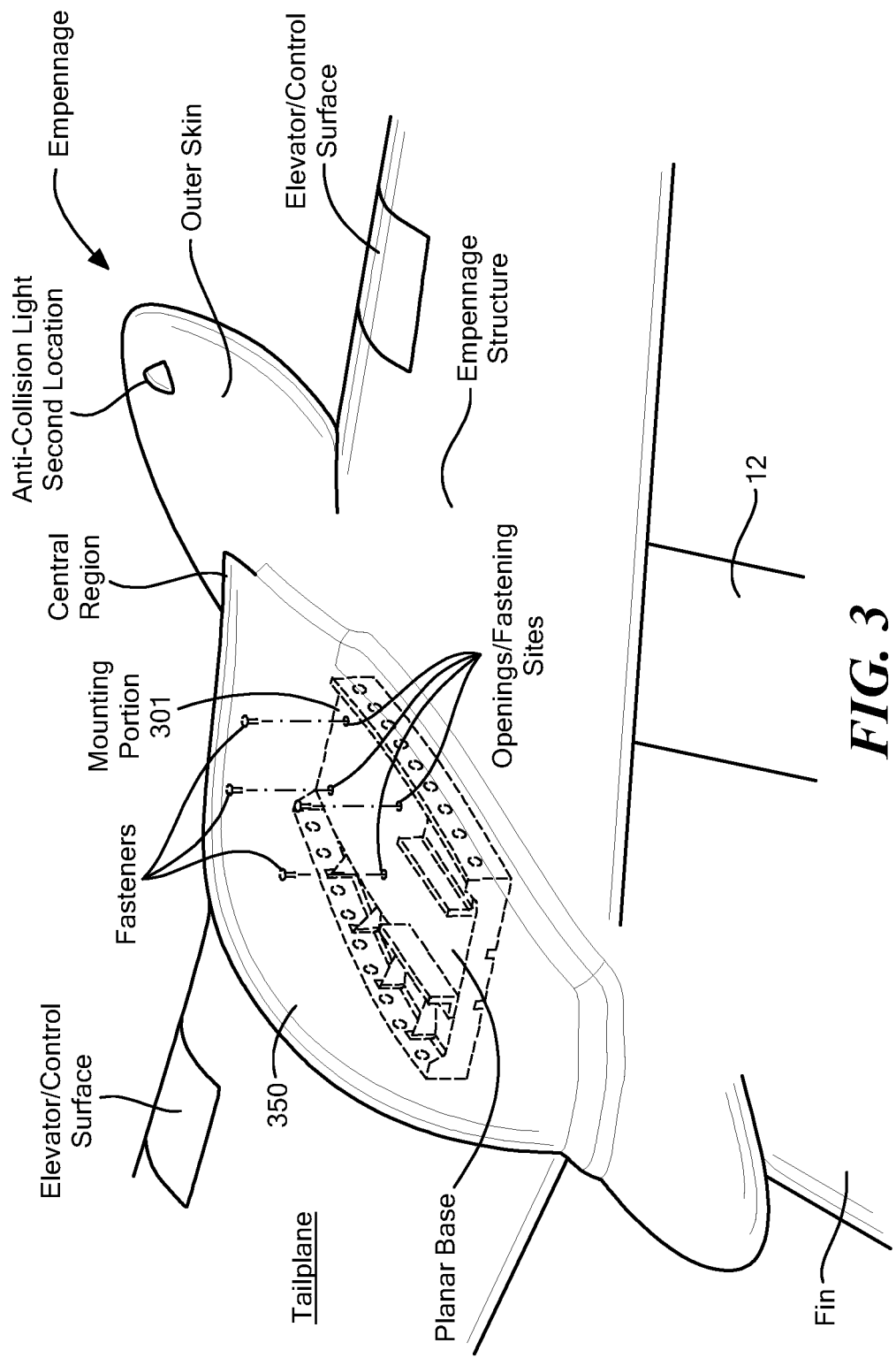
FIG. 3 shows a perspective view of an equipment assembly according to the present invention mounted to an empennage of an aircraft.
Figure 4:
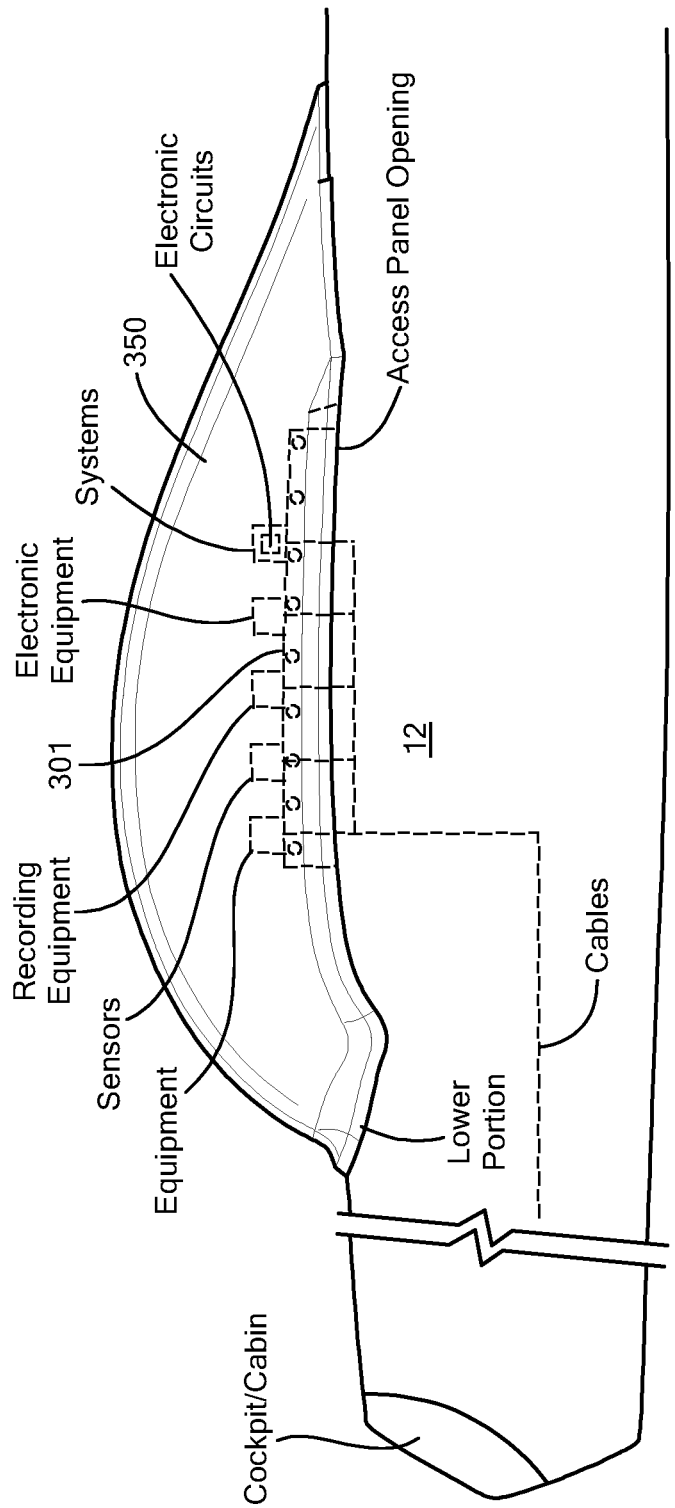
FIG. 4 shows a side view of the equipment assembly of FIG. 3.
Figure 5:
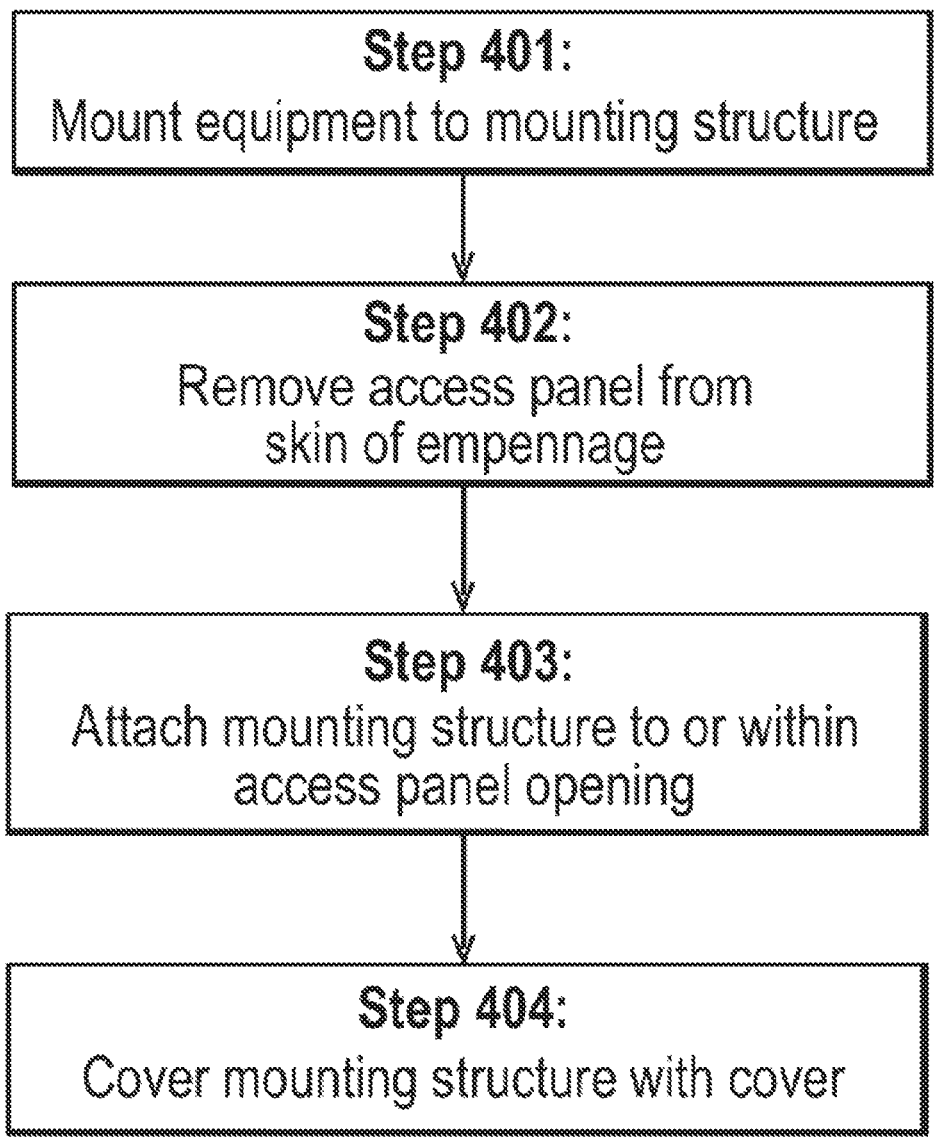
FIG. 5 shows a flow diagram of a method according to the present invention.

As shown in FIGS. 3 and 4 of the drawings, the base and edges of the mounting structure are curved so as to conform to the curvature of an aircraft in which mounting structure may be mounted. Alternatively, the base and edges may be generally planar, as shown in FIGS. 2a and 2b, for example. As another alternative, the surface of the base which is closest to an aircraft can be curved to conform thereto and the opposite surface can be planar. In other words, the base thickness is not uniform and tapers as required.

The edge portions or sides 103, 203 of the tray contain a series of openings or holes 104, 204. The holes provide the means by which the mounting structure 100, 200 may be attached to the aircraft. For example, a screw or bolt may be fed through each of the holes in the tray, and a corresponding opening or hole in the aircraft. Alternative fastening means will be readily apparent to the skilled person.

In the examples shown, the dimensions of the tray 101, 201 are 400 mm (width) by 300 mm (length) by 60 mm (height), though preferred dimensions may differ. For example, the tray's width may be between 100 mm and 1000 mm, preferably between 200 mm and 800 mm, preferably between 300 mm and 600 mm. The tray's length may be between 50 mm and 800 mm, preferably between 100 mm and 600 mm, preferably between 200 mm and 400 mm. The tray's height may be between 10 mm and 110 mm, preferably between 30 mm and 90 mm, preferably between 50 mm and 70 mm. Of course, these dimensions are purely exemplary for a typical aircraft and could be bigger or small depending on the application.

The mounting structure is made from aluminum, but may be made from any suitable metal, including titanium, or conductive material, or a carbon fibre material or composite material or reinforced plastics material.

As shown in FIG. 2a of the drawings, the tray 101 only has three perpendicularly extending sides. This means that the tray has an open end 105 which allow cables to be easily routed to and from the mounting structure 100. As shown in FIG. 2b of the drawings, the tray 201 has two edge portions extending in the same plane as the base. This means that the tray has two open sides 205a, 205b which allow cables to be easily routed to and from the mounting structure 200.

The mounting structure 100, 200 has a number of brackets 106, 107, 206, 207 to assist with the mounting of equipment therein. The mounting tray 101, 201 can be compartmentalized to assist with the mounting of equipment and/or provision of isolation between different pieces of equipment.

The tray comprises a variety of equipment (not shown) including sensors, recording equipment and various electronic equipment or systems, including electronic circuits. The equipment can be permanently attached to the tray 101, 102, for example via the one or more brackets 106, 107, 206, 207, which means that different configurations of equipment can readily attached to the aircraft by changing the mounting structure. Alternatively, certain equipment can use a plug and socket architecture to facilitate change of individual components. Given that the surface of the base 102, 202 which is closest to an aircraft can be curved to conform thereto, this means that the opposite surface and equipment thereon is external to the main body of the aircraft. Accordingly, the equipment is less likely to be interfered with the aircraft body. The equipment can thus perform optimally. For example, certain circuits can be compartmentalized to further isolate them from the aircraft body.

Of course, such equipment cannot be directly exposed to the environment in which the aircraft may operate. Accordingly the equipment is protected by a cover 350 as shown in FIGS. 3 and 4 of the drawings. The cover 350 is configured to have a minimum width, length and height that covers the mounting tray 301 and equipment (not shown) installed therein. Whilst somewhat constrained by the dimensions of the mounting tray 301 and equipment installed therein, the overall shape of the cover 350 is optimized in a manner that preserves the aerodynamic profile of the aircraft. For example, if the mounting tray 301 was located on top of the T-Tail and centrally between the elevators on T-Tail, as shown in FIG. 3, the cover 350 could be shaped so that the trim of the aircraft is preserved. In effect, the system located on the T-Tail of an aircraft has no adverse aircraft performance characteristics. The skilled person in the field of aerodynamics can readily design a cover to cover the mounting structure and the equipment installed without adversely affecting the aircraft trim.

To assist with the attaching the cover 350 to the mounting structure 300, the cover 350 can have series of holes (not shown) that correspond and align with the series of holes in the mounting structure 300. A screw or bolt may be fed through each hole in the cover and a corresponding hole in the both the mounting structure and aircraft to fasten both the mounting structure and cover to the aircraft. This helps maintain a secure alignment between the mounting structure and cover which in turn improves the seal therebetween.

In performing a method according to the invention, equipment is mounted to the mounting structure (step 401). This can be done before or after attaching the system to the aircraft. To attach the system to a T-tail aircraft, a flat inspection panel 10 located on top of the T-Tail 12 and centrally between the elevators 14 on the T-Tail can be removed (step 402). An exemplary T-tail is shown in FIG. 1. Alternatively, the system could be fitted during manufacture of the aircraft instead of the flat inspection panel 10. The mounting structure 100, 200, 300 is then placed in the void left by the removal of the flat inspect panel 10 (step 403). The tray can either have equipment including sensors, recording equipment and various electronic equipment or systems, including electronic circuits pre-installed or alternatively it can be installed after placement of the mounting structure (e.g. using plug and socket architecture). Any cable connection (not shown) to/from the aircraft itself can be made using an open end (or hole) of the mounting tray, as described above. The cover 350 is then placed over and aligned with the mounting structure 100, 200, 300 (step 404). Redundant fastener locations that exist due to the removal of the flat inspection panel 10 can then be used to secure the system as explained above.

In terms of equipment which may be placed in the mounting structure 100, 200, 300, a variety of uses are particularly advantageous. In particular, the mounting structure 100, 200, 300 may be configured to contain sensors and such like. Due to its particular location, and ease of access to the external environment, the mounting structure may contain or be configured to contain electrically sensitive or electrically noisy equipment, equipment such as sensors that would benefit from an uninterrupted field of view outside the aircraft, or equipment which may be useful to affect the balance of the aircraft. The mounting structure may contain or be configured to contain equipment for surveying or weather monitoring, such as cameras, sensors, and suchlike.

It will be appreciated that, in use, the mounting structure 100, 200, 300 is unpressurised and unheated, such that when the aircraft is flying, for example at cruise altitude, it would be particularly advantageous to use it to provide a low temperature and low pressure environment, very close to ambient. This facilitates the use of the mounting structure to contain equipment that requires a low temperature or low pressure environment to operate, and/or is not capable of being actively cooled and therefore benefits from passive cooling from the surrounding environment. Such equipment may include high powered and/or acoustically noisy equipment, which may include avionics equipment, power converters or amplifiers that may operate with high power and therefore generate high temperatures during operation; or temperature sensing equipment that needs to operate frequently at sub-zero (deg C.) temperatures.

It will be appreciated that the location of the mounting structure 100, 200, 300 on the T-tail 12 means that it may be particularly advantageous to use it for storage of equipment to benefit the loading and/or balance of the aircraft. For example, where an aircraft may be loaded with significant weight toward the nose of the fuselage, equipment positioned in the mounting structure may act as a counterbalance.

It will be appreciated that because the mounting structure 100, 200, 300 is external to the fuselage and thus isolated from the interior and the avionic systems contained therein, it would be particularly advantageous to use it to contain equipment that is either electrically sensitive (and would therefore be undesirably influenced by the electronic systems within the fuselage) or electrically noisy (and would therefore undesirably influence the aircraft systems within the fuselage). Thus, the mounting structure offers an optimal location in terms of achieving Electromagnetic Compatibility (EMC) and/or to isolate radiated emissions from inside or outside the aircraft. For example, since the mounting structure is located as far away as possible from the rest of the platform avionics systems as possible to reduce the risk of EMC interference.

It will be appreciated that because the mounting structure is adjacent the empennage structure, it would be particularly advantageous to use it for datalogging equipment for measuring and/or and recording parameters related to the elevators, rudder and other equipment mounted in the tail, for the purposes of testing and evaluation.

Thus, a method and system have been described with can allow the retrofitting of equipment to a T-tail aircraft in a location that provides an optimal position. The system is securely sealed and anchored to the aircraft and permits optimal equipment performance.

The invention claimed is:

1. A method of mounting equipment to an aircraft having an empennage, the method comprising;
   mounting equipment to a mounting structure for mounting to the aircraft;
   removing an access panel from the outer skin of the empennage of the aircraft to reveal an access panel opening into the empennage;
   attaching the mounting structure to or within the access panel opening such that at least a portion of the equipment extends beyond the outer skin of the empennage, and wherein the shape of the mounting structure at least partly conforms to the shape of the access panel opening; and
   covering the mounting structure and the equipment mounted thereon with a cover, and attaching the cover to the mounting structure or the empennage,
   wherein the access panel is a planar inspection panel, and wherein the access panel opening is a planar inspection panel opening for providing access to the empennage of the aircraft.

2. The method of claim 1, wherein the empennage has T-tail configuration comprising a fin mounted to a fuselage of the aircraft at a lower end of the fin, and a tailplane mounted to the fin at an upper end of the fin, and wherein the step of removing an access panel comprises removing an access panel from the upper surface of the tailplane.

3. The method of claim 2, wherein the step of removing an access panel comprises removing an access panel from a central region of the upper surface of the tailplane, wherein the central region is located equidistantly between two control surfaces, comprising elevators, on the empennage.

4. The method of claim 1, wherein the mounting structure is a tray comprising a planar base and at least one mounting portion extending in parallel with or orthogonally to the planar base, and wherein the step of attaching the mounting structure to or within the access panel opening comprises passing one or more fasteners through the at least one mounting portion to a corresponding one or more fastening sites in the access panel opening or in an adjacent area of the empennage.

5. The method of claim 4, wherein the step of removing the access panel from the outer skin of the empennage of the aircraft comprises removing one or more fasteners passing through the access panel from the said one or more fastening sites.

6. The method of claim 1, wherein the step of attaching the cover to the mounting structure or the empennage comprises passing one or more fasteners through a lower portion of the cover to a corresponding one or more fastening sites in the mounting structure, in the access panel opening or in an adjacent area of the empennage.

7. The method of claim 1, wherein the equipment comprises one or more sensors, one or more pieces of recording equipment and/or one or more electronic equipment or systems, including electronic circuits.

8. The method of claim 1, further comprising the step of routing cables from the aircraft, comprising the aircraft cockpit or cabin, to the equipment on the mounting structure.

9. The method of claim 1, wherein prior to the step of attaching the mounting structure to or within the access panel opening, the method further comprises removing an anti-collision light from a first location on the empennage.

10. The method of claim 9, further comprising the step of reattaching the anti-collision light to a second location on the empennage, different from the first location.

11. An equipment assembly for attaching to an empennage of an aircraft, the equipment assembly comprising:
   a mounting structure attached to the empennage, wherein the mounting structure is shaped, at least in part, to conform to an access panel opening on the empennage of the aircraft, and wherein the mounting structure comprises equipment extending from one side of the mounting structure; and
   a cover configured to cover the equipment and the mounting structure, wherein the access panel is a planar inspection panel, and wherein the access panel opening is a planar inspection panel opening for providing access to the empennage of the aircraft.

12. The assembly of claim 11, wherein the mounting structure is a tray comprising a planar base and at least one mounting portion extending in parallel with or orthogonally to the planar base, the mounting portion configured to attach the mounting structure to the access panel opening or an adjacent area of the empennage.

13. The assembly of claim 12, wherein the at least one mounting portion comprises at least one fastener or else is configured to allow one or more such fasteners to pass through the at least one mounting portion through openings therein.

14. The assembly of claim 11, wherein the cover comprises a lower portion comprising at least one fastener configured to attach the cover to the mounting structure, the access panel opening or an adjacent area of the empennage, or else is configured to allow one or more such fasteners to pass through the lower portion through openings therein.

15. The assembly of claim 13, wherein the mounting portion comprises openings that are spaced apart by a distance corresponding to the distance between fastening sites in the access panel opening or in an adjacent area of the empennage to which the mounting portion is to be attached.

16. The assembly of claim 13, wherein the lower portion of the cover comprises openings that are spaced apart by a distance corresponding to the distance between fastening sites in the mounting structure, in the access panel opening or in an adjacent area of the empennage to which the cover is to be attached.

17. The assembly of claim 11, wherein the equipment comprises one or more sensors, one or more pieces of recording equipment and/or one or more electronic equipment or systems, including electronic circuits.

18. The assembly of claim 11, further comprising cables extending from the equipment on the mounting structure.

19. The assembly of claim 11, wherein the cover is configured to preserve the trim of the aircraft and conform to the upper cross-sectional shape of an aerofoil.

20. The assembly of claim 11, wherein the cover is configured to protect the empennage and/or the aircraft and/or the mounting structure and/or the equipment mounted within the mounting structure from lightning.

21. The assembly of claim 20, wherein the cover and/or the mounting structure is made from a conductive material, comprising a metal, that is capable of conducting energy from a lightning strike into the aircraft structure, comprising the empennage.

* * * * *